March 17, 1931. T. A. BOWERS 1,796,882
THREE-PLY PACKING RING
Filed Feb. 27, 1930
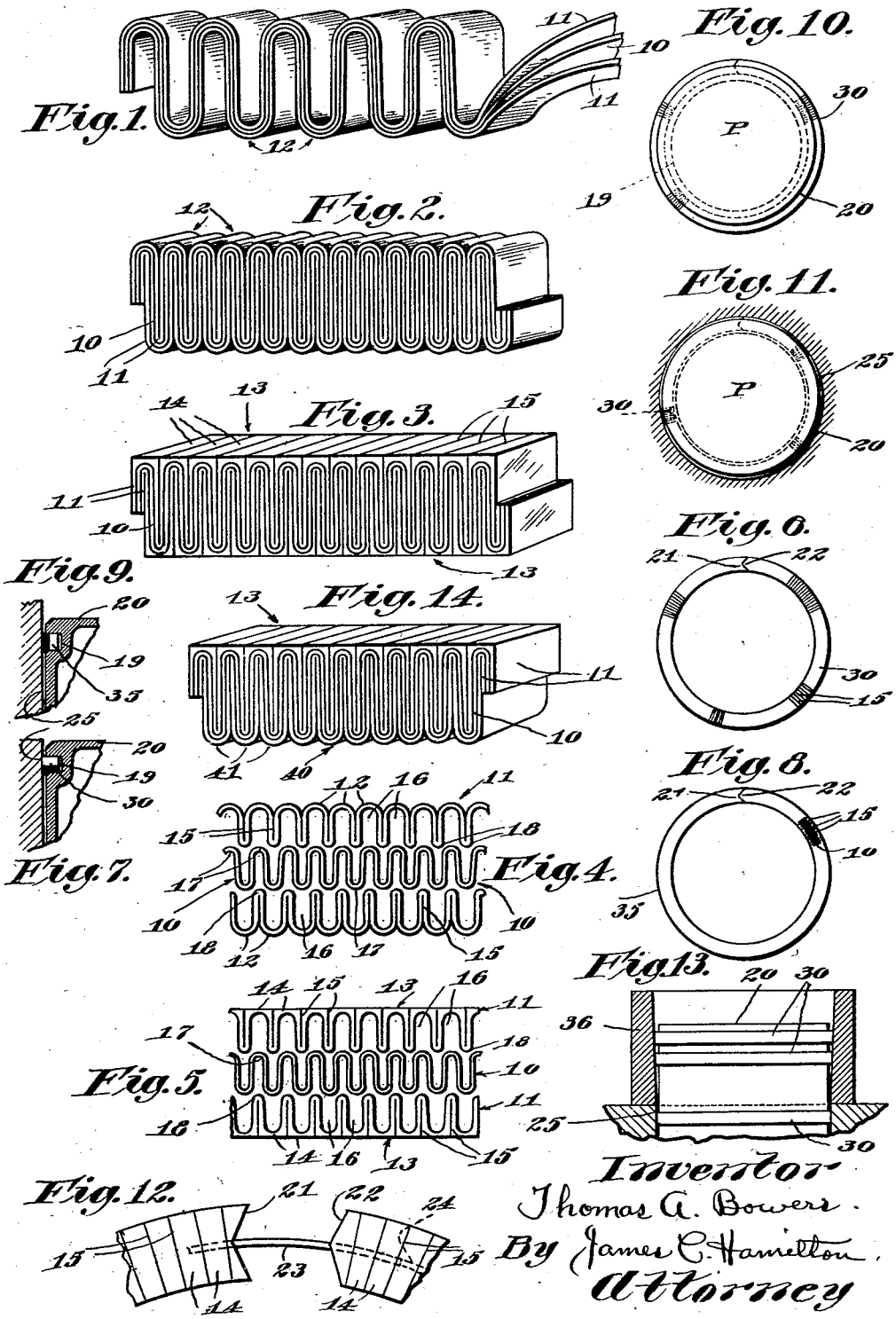
Inventor
Thomas A. Bowers.
By James C. Hamilton,
Attorney Patented Mar. 17, 1931

1,796,882

UNITED STATES PATENT OFFICE

THOMAS A. BOWERS, OF BOSTON, MASSACHUSETTS, ASSIGNOR TO PRESSED PISTON RING COMPANY, A CORPORATION OF MASSACHUSETTS

THREE-PLY PACKING RING

Application filed February 27, 1930. Serial No. 431,814. REISSUED

My present invention relates to packing rings and more particularly to packing rings for use in combination with reciprocating pistons which are used in steam engines, internal combustion engines, air compressors, pumps and the like.

In the engineering field it is a well known and universally recognized fact that a packing ring must fit snugly in the cylinder bore of the engine at all points around the periphery of the ring in order to prevent leakage of compression and oil and that an ideal piston ring should have some of the characteristics of rubber but at the same time stand up under heat, friction and other elements to which it is exposed which, of course, rubber would not do.

Heretofore, practically all packing rings for pistons have been made from cast metal such as cast iron either in one form or another in which the ring is split at one point on its side by cutting a section of the ring away. A ring of this type normally presents a periphery which is a true circle except where the slot or cut-away portion occurs. This normal periphery is larger in diameter than the bore of the cylinder in which it is to be placed and is reduced in diameter to fit such bore by pressing the ring together at the cut-away portion. When a ring of this character is so pressed together for the purpose of reducing its diameter for insertion in a cylinder bore in combination with a piston, the natural formation or shape of the ring is slightly oval in shape about its periphery and in order to force it into the bore of the cylinder the back sides of the ring with respect to the slotted side must be deformed or bent outward against the walls of the cylinder bore. This is against the natural reaction of the ring. The result of this deformation is to create an unequal lateral thrust against the wall of the cylinder varying at different points about the wall and reaching a maximum point adjacent that portion of the ring near the slot. This effect is an inherent feature with all cast metal rings of this type which results in wearing the ring thinner at one point than another and wearing the cylinder bore out of round also, to the end that, eventually the sides of the ring remote from the slotted side tend to recede from the wall of the cylinder and allow compression to blow by the piston, and oil to pass in an opposite direction. There are also other forces in operation in a reciprocating engine tending to increase the oval shape of the cylinder bore, such as piston slap and piston side thrust caused by the revolutions about the crank shaft and excessive clearance between the cylinder wall and piston which may be to some extent traceable to worn rings.

Many attempts have been made in the past to construct a metal packing ring for pistons and the like which will stand up mechanically and give uniform flexibility on the cylinder wall, such as relatively thin cast metal rings with separate expander units located behind the ring for the purpose of holding the deformed shape against the cylinder wall in a more even degree of side thrust, and while such rings do accomplish the result of forming up to the out of round cylinder bore, yet it does so at the expense of the cylinder wall because of increased friction caused by the extremely high lateral side thrust on the cylinder walls. Most rings of this class as well as modified types are open ended rings, that is, the ends of the slots do not fully close as clearance must be left to allow for expansion under heat.

My present invention, however, is a closed end ring such that the two ends are in contact with each other, the expansion of the ring being taken up by the multiplicity of laminations comprising the body of the ring itself.

In my ring there may be as many as several hundred or more laminations substantially arranged in a vertical plane with respect to the cylinder wall, the laminations coacting against each other in a resilient and compressible manner. My complete ring is made with a diameter normally oversized with respect to the cylinder bore and when inserted in the bore the piston with rings attached may be pulled down through a tapering cone, the small end of which is approximately the size of the cylinder bore as it enters the cylinder block. This reduction in diameter creates an outward thrust against the cylinder wall uniformly the same at every fraction of a degree about the circumference of the ring. If the bore of the cylinder is slightly out of round as is the case where new rings are necessary, the extreme flexibility of my ring allows it to conform to the contour of the cylinder bore without requiring any appreciable amount of thrust at that point over any other point about the circumference of the ring. If my ring is made of the same material or of material having the same degree of hardness as in the cast metal type previously discussed, it is readily apparent that my ring will greatly outwear the prior ring without allowing any gases to blow by. Therefore, I can use a metal of a softer character than the prior rings, such as bronze, and attain the same length of life as would be present in the prior cast metal ring, but, in so doing I have reduced the wear on the cylinder walls, thereby prolonging the life and efficiency of the motor.

The amount of compressibility present in my ring depends upon the gauge and kind of metal used, that is, the smaller the gauge the greater the number of laminations, and the greater the temper of the material used the greater the expansibility. As the periphery of the ring wears the spaces between the laminations slightly expand although such expansion would not be perceptible at any one point with the naked eye and when the ring has worn sufficiently on its periphery for the spaces between the laminations to fully expand to their normal limits the ring will be due for replacement, and such replacement may be accomplished many times without reboring the cylinder walls while the length of life of any one ring may be approximately as long as in a cast iron ring, assuming that the proper material is used, this being made possible by the much lighter side thrust used in my ring over the cast metal types.

While my ring is ideally suited for replacement purposes to correct the out-of-round condition of the cylinder bore, yet, it is also ideally suited for new installation work because a ring of this character will greatly prolong the length of life of the cylinder bore which means more engine efficiency in every phase of the motor.

My improved packing ring is composed of sheet metal made up in various forms and shapes and because of this fact is subdivided in numerous patent applications, any one of which is generic to the above description.

The type of ring comprising the present invention and to which this application is restricted is composed of a plurality of metal ribbons of not less than three in number but may be increased to any odd number which may be desired, as 5, 7, 9, etc. In the preferred form illustrated in this application three ribbons are used, the two outer ribbons being made from one kind of material, as bronze, and the central ribbon being made from a harder material such as steel.

The principal object of this invention, therefore, is an improved packing ring for pistons and the like;

Another object is a piston packing ring which is compressible in a longitudinal direction;

Another object is a piston packing ring which is compressible and flexible transversally across the diameter of the ring;

Still another object is a piston packing ring which is closed at its ends when in use and therefore presents a continuous and substantially unbroken seal around the piston, and Other objects and novel features comprising the construction and operation of my invention will appear as the description of the same progresses.

In the drawings illustrating the present invention:

Fig. 1 is a perspective view of one of the preliminary steps in the formation of the ring material particularly illustrating the three individual metal ribbons;

Fig. 2 is a second step also shown in perspective, in which the loops of corrugations shown in Fig. 1 have been closed up or pressed together such that all sides are in contact with each other;

Fig. 3 is another perspective view similar to Fig. 2 but carrying the formation a step further. In this step the rounded ends of the pressed corrugations have been swaged off into parallel flat surfaces;

Fig. 4 illustrates a separated view of the material as shown in Fig. 2 prior to the swaging process;

Fig. 5 is a similar separated view of the material after having been swaged as shown in Fig. 3;

Fig. 6 shows a completed ring in which the edges of the folded ribbons are adapted to contact with the cylinder wall;

Fig. 7 is a typical segmental cross section taken through the head of a piston and cylinder wall showing the ring assembly as shown in Fig. 6 in place in the piston and cylinder bore;

Fig. 8 illustrates the same ring material as shown in Fig. 6 but turned at 90 degrees thereto;

Fig. 9 shows the ring illustrated in Fig. 8 in place in a piston and cylinder bore, being a view similar to Fig. 7;

Fig. 10 illustrates the normal expanded ring in place in the grooves of a piston prior to insertion in a cylinder bore;

Fig. 11 is a view showing the same piston and ring as shown in Fig. 10 but after they have been inserted within a cylinder bore, particularly illustrating the contraction of the ring into a smaller diameter due to lineal compression of the ring material;

Fig. 12 is a detail view of the ends of the ring showing a slip-wire insertion in the ring material for the purpose of opening up the ring diameter prior to slipping over the head of a piston;

Fig. 13 is a fragmentary cross section through the top of a cylinder showing a piston in elevation in the act of being drawn down through a tapered collar resting over the cylinder bore for the purpose of contracting the ring material to the size of the cylinder bore prior to insertion in the said bore, and Fig. 14 shows the same ring material as shown in Fig. 3 except that the lower side 13 has not been swaged off flat like the top side; this looped side allows for oil penetration to the back of the piston ring groove in the piston such that this cavity may be maintained full of oil and act as a cushion to reduce piston slap.

Referring more specifically to the drawings, 10 indicates a ribbon of soft steel interposed between two ribbons of softer metal 11, as bronze or some other good bearing metal compound.

The ribbons 10 and 11 are fed through corrugating or crimping mechanism, not shown, and the corrugations or crimps 12 are formed after which they are pressed together lengthwise as shown in Fig. 2. The material comprising the ribbons are now swaged along the tops of the corrugations 12 such that the metal is flowed into flat parallel sides 13 but divided into flat rectangular segments 14 having dividing lines 15 partially separating each other. Figs. 4 and 5 more clearly show the shape of the ribbons 10 and 11. Fig. 4 showing the outer loops of the corrugations 12 in their natural formation prior to flattening as shown in Fig. 5 by swaging. The cavities 16 of the members 11 correspond to the uniform bends 17 of the central steel ribbon 10 and are approximately the same width as the inwardly extending dividing members 18. It will be apparent from an inspection of Fig. 5 that the ribbons 11 now take on the shape of a rack, the teeth members 18 dove-tailing into the uniform corrugated ribbon member 10 and such teeth members 18 being alternately opposed on either side of the corrugations 17 of the member 10. The member 10 is composed of semi-soft steel initially but after being bent and compressed into the form shown in Fig. 3 it takes on a certain amount of temper which results in producing a spring effect when placed under tension or compression.

It should be understood at this point that the ribbons 10 and 11 may be composed of very thin material two one thousandths of an inch more or less and that a complete piston ring having a lineal measurement of say eight or ten inches is consequently made up of a great multiplicity of laminations and that a slight space of one hundredth of one thousandth of an inch may present a solid surface to the eye and be the same as solid for some purposes, yet present a longitudinally compressible and expansible material when confined against its natural tendencies. The number of such laminations is determined over a given length by the gauge of metal used in the ribbons 10 and 11 and may be varied at will within great limits as the conditions may warrant. In the present application the material shown in Fig. 3 is adapted to fit the ring-groove 19 of the piston 20, the ends of the ring being dove-tailed as at 21 and 22 for the purpose of presenting a butt-ended ring. A wire 23 may be secured in the end 21 and adapted to slide in a hole 24 provided in the end 22 if desired for the purpose of guiding and holding the ends of the ring when inserting in the bore of a cylinder. Any other form of joint on the ring ends would be sufficient for the purpose, the wire 23 not being essential for the operation of the ring but being valuable for the purpose of maintaining the ring in a circular form prior to assembling on a piston and allowing the ring to be easily assembled in the piston ring groove 19 of the piston 20. When the ring is bent into a circle as shown in Fig. 6 it is apparent that there is a radial spring effect created in the ring material due to the fact that the central ribbon is composed of a more or less tempered metal and that each of the segments 14 are opening slightly on the periphery of the ring at the lines 15 and the inner edge of the ring is tending to squeeze the lines at that point together, all of which tends to produce a potential thrust outward, but I am not dependent altogether upon this type of side thrust to maintain a contact on the cylinder wall 25 although such forces in the ring segments are active on the cylinder wall 25 as long as the ends 21 and 22 are maintained in contact, yet, I may obtain a radial thrust upon the cylinder wall 25 in a different manner as I will now describe, the thrust being uniform as is not the case where cast rings are used.

Due to the fact that the ring material may be compressed lengthwise, as previously mentioned, I construct the ring slightly longer than it will be when in the cylinder bore such that the expanded diameter of the ring is greater than the bore of the cylinder as shown in Fig. 10; the piston P is now inserted in the cylinder bore by any suitable means such as pulling the piston and ring down through a tapered sleeve 36, the small end being the size of the cylinder bore or slightly smaller when the ring 30 or 35, as the case may be, is thus pulled through a tapered sleeve 36 such as shown in Fig. 13, the laminations of the ring 30 or 35 are compressed together causing the diameter of the ring to shrink, the lateral thrust on the cylinder wall 25 to increase, and the ring to conform to any desired outline of the cylinder wall 25.

Fig. 8 shows the ring with the swaged edges 13 on the outer side of the ring such that the minute cracks across the wearing surface would provide oil distribution on the cylinder wall. The natural spring or resiliency of this ring arrangement is, as taken across the diameter of the ring, somewhat less than that shown at Fig. 6 due to the fact that the crimped metal is bent along the center of the curves of the crimp bend while in that shown in Fig. 6 the bending of the metal is across the width of the metal.

It will be apparent that much more resistance is present in bending a crimped ribbon into a circle with the edges of the metal on the periphery of the ring as shown in Figs. 3 and 6 than would be the case if the ring material was turned at ninety degrees as shown in Fig. 8.

Fig. 14 shows another feature of this invention, in that the lower crimped side 40 is left in its original shape as shown in Fig. 2, the top side only being swaged. The center and top ribbons 10 and 11 respectively are identically the same as in Fig. 3 but by leaving the loops 41 rounded except for a slight flattening at their tops necessary for fitting requirements in the piston groove 19, a very desirable effect may be accomplished. The ring naturally carries some oil up with each stroke of the piston and on the downward stroke a portion of such oil is forced in under the ring between the crimped or scalloped surface 41 to the effect that a reservoir of oil is always maintained behind the ring in the piston groove 19. The purpose of this reservoir of oil is two-fold, i. e., to lubricate the piston ring and to provide an oil cushion against which the piston body 20 may cushion when the piston tends to thrust to one side on the ring. This cushion effect is sufficient to lessen the slap of the piston due to the fact that the time factor involved in displacing the oil when the piston 20 tends to move sidewise against the cylinder wall 25 is too great to allow the piston to act quickly and before the oil can be displaced around the ring or from under it, the piston is too far advanced on its stroke to be noticeable, and during this piston stroke the cavity behind the ring is again being replenished with oil.

Having thus described my invention, what I claim as new is:—

1. A flexible packing ring for pistons and the like comprising a plurality of metal ribbons, said ribbons corrugated together in a unitary manner and in close formation, said corrugated formations being vertically disposed with respect to the side walls of a piston.

2. A flexible packing ring for pistons and the like comprising a plurality of metal ribbons, said ribbons corrugated together in a unitary manner and in close formation, said corrugated formations being vertically disposed with respect to the side wall of a piston, the top loops of said corrugations being flattened to form a continuous flat surface.

3. A flexible packing ring for pistons and the like comprising a plurality of metal ribbons, said ribbons corrugated together in a unitary manner and in close formation, said corrugated formations being vertically disposed with respect to the side wall of a piston, the top and bottom loops of said corrugation being flattened to form a continuous flat surface.

4. A flexible packing ring for pistons and the like comprising a plurality of metal ribbons, said ribbons corrugated together in a unitary manner and in close formation, said corrugated formations being vertically disposed with respect to the side wall of a piston, the top loops of said corrugations being flattened to form a continuous flat surface, the ends of said ring being adapted to butt, and means for holding said ring ends in place.

5. A flexible packing ring for pistons and the like comprising a plurality of metal ribbons, said ribbons corrugated together in a unitary manner and in close formation, said corrugated formations being vertically disposed with respect to the side wall of a piston, the top and bottom loops of said corrugation being flattened to form a continuous flat surface, the ends of said ring being adapted to butt, and means for holding said ring ends in place.

6. A flexible packing ring for pistons and the like formed from a plurality of metal ribbons folded upon themselves, the central ribbon comprising a true corrugated member adapted to be compressed and expanded longitudinally, interlocking outer members also adapted to be compressed and expanded longitudinally, the ends of said members adapted to butt each other to form a substantially closed ring.

7. A flexible packing ring material for pistons and the like comprising a plurality of ribbons formed into vertical corrugations, the said corrugations being pressed together longitudinally of the ring for the purpose of forming a substantially solid material.

8. A flexible packing ring material for pistons and the like comprising a plurality of ribbons formed into vertical corrugations, the said corrugations being pressed together longitudinally of the ring for the purpose of forming a substantially solid material, said material being flattened along the tops of the corrugations for the purpose of furnishing a flat surface.

9. A flexible packing ring material for pistons and the like comprising a plurality of ribbons formed into vertical corrugations, the said corrugations being pressed together longitudinally of the ring for the purpose of forming a substantially solid material, said material being flattened along the tops and bottoms of said corrugations for the purpose of furnishing a flat surface.

10. A flexible packing ring material for pistons and the like comprising three portions, a substantially true corrugated central ribbon member, two outer ribbon members having flat parallel outer sides and corrugated inner sides alternately meshing with corrugations of said central ribbon.

11. A flexible packing ring material for pistons and the like comprising three portions, a substantially true corrugated central ribbon member, two outer ribbon members having flat parallel outer sides and corrugated inner sides alternately meshing with corrugations of said central ribbon, the said outer portions being partially split inwardly from the outside on a medial line of the inner extending corrugations.

12. A flexible closed end piston ring comprising a plurality of ribbons vertically corrugated together and flattened at the tops of said corrugations on the top side of said ring.

13. A flexible closed end piston ring comprising a plurality of ribbons vertically corrugated together and flattened on the corrugated bends to form flat surfaces.

14. A flexible packing ring material for pistons and the like comprising three parts, the center portion comprising a substantially parallelly corrugated ribbon, the two outer portions comprising alternate interlocking loops surrounding the loops of said corrugations on said central portion, said outer portions being formed integral with said central corrugated ribbon, the material of said outer portions being folded on itself alternately with respect to the open loop portions surrounding the center ribbon corrugations, the top of said outer portions being flattened to form flat parallel sides.

In testimony whereof I have affixed my signature.

THOMAS A. BOWERS.